Jan. 16, 1934.  F. D. SWEET  1,944,038
FILM HANDLING APPARATUS AND FOOTAGE RECORDING DEVICE THEREFOR
Filed July 7, 1930   2 Sheets-Sheet 1

INVENTOR.
FREDERICK D. SWEET.
BY Waldo G. Morse
ATTORNEY

Jan. 16, 1934.　　　　F. D. SWEET　　　　1,944,038
FILM HANDLING APPARATUS AND FOOTAGE RECORDING DEVICE THEREFOR
Filed July 7, 1930　　　2 Sheets-Sheet 2
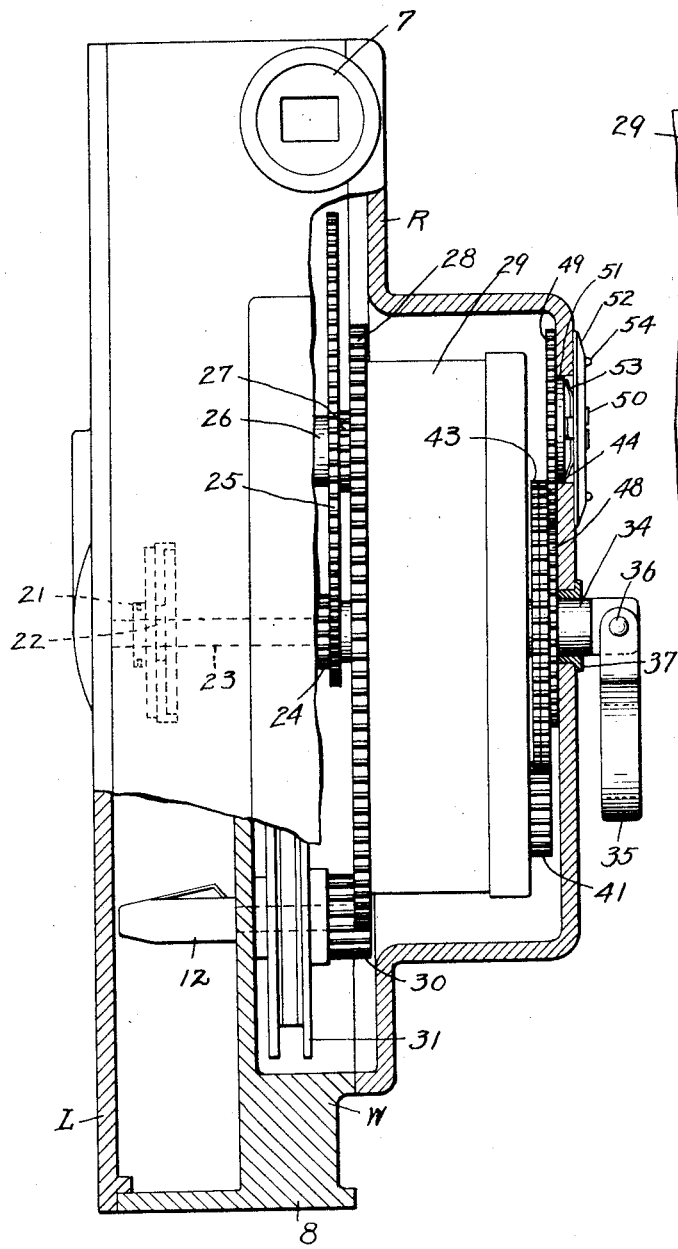
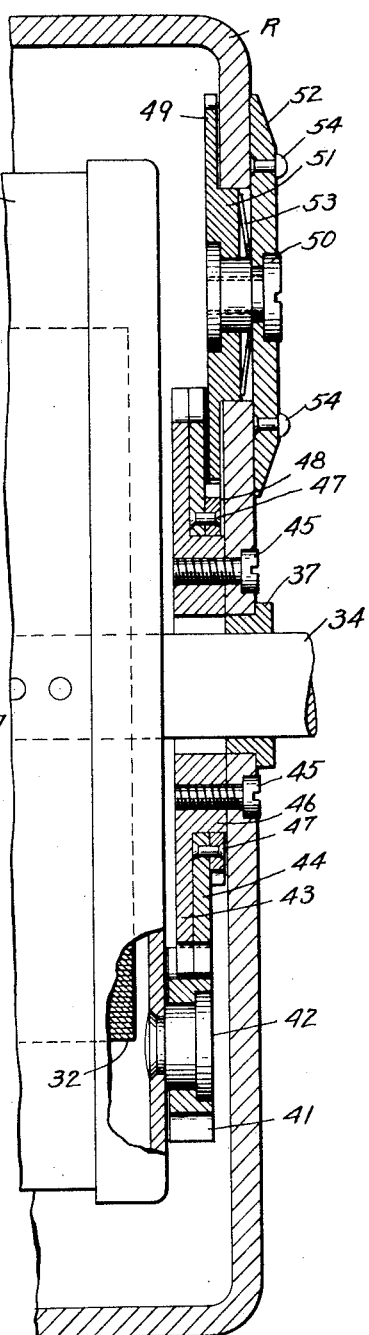
INVENTOR.
FREDERICK D. SWEET.
BY Waldo G. Morse
ATTORNEY Patented Jan. 16, 1934

1,944,038

UNITED STATES PATENT OFFICE 1,944,038

FILM HANDLING APPARATUS AND FOOTAGE RECORDING DEVICE THEREFOR

Frederick Davenport Sweet, New York, N. Y., assignor, by mesne assignments, to Kinatome Patents Corporation, New York, N. Y., a corporation of New York Application July 7, 1930. Serial No. 465,986

19 Claims. (Cl. 88—16)

The present invention is applied broadly to the art of photography and more particularly to apparatus for the taking or projection of pictures, but it will be readily understood that it is applicable to many other uses. Among the objects of my invention are the provision of improved means which indicate the amount of film which has been fed through a film handling apparatus and the construction of such device and such apparatus in such manner that the manufacture thereof and assembly of the necessary parts into the complete working instrument, or their repair, is much simplified and cheapened. A footage recording device constructed according to the present invention requires a minimum of power. In view of the operation of an amateur motion picture camera, for instance, by a spring, necessarily limited in power because light in weight to assure portability, such minimum power requirement is of the first order of utility.

I am showing my invention as applied to the camera of the type described and claimed in the co-pending application of Barton Allen Proctor, Serial Number 187,980, filed April 30, 1927, but it will be readily understood that it may be applied to any preferred type of film handling apparatus or in fact to any apparatus in which strip material of any sort is fed.

Other advantages, objects, and characteristics of my invention are apparent from the following description, the attached drawings and the subjoined claims. Although I am showing one preferred embodiment of my invention, it will be readily understood that I am not limited to this particular construction as changes can be readily made without departing from the spirit of the invention or the scope of my broader claims.

In the drawings:

Figure 2 is a view taken on the line II—II of Figure 1 looking in the direction of the arrows;

Figure 3 is an enlarged view, partly in section, of the spring housing the outer enclosing casing and the mechanism of the meter.

Figure 1:
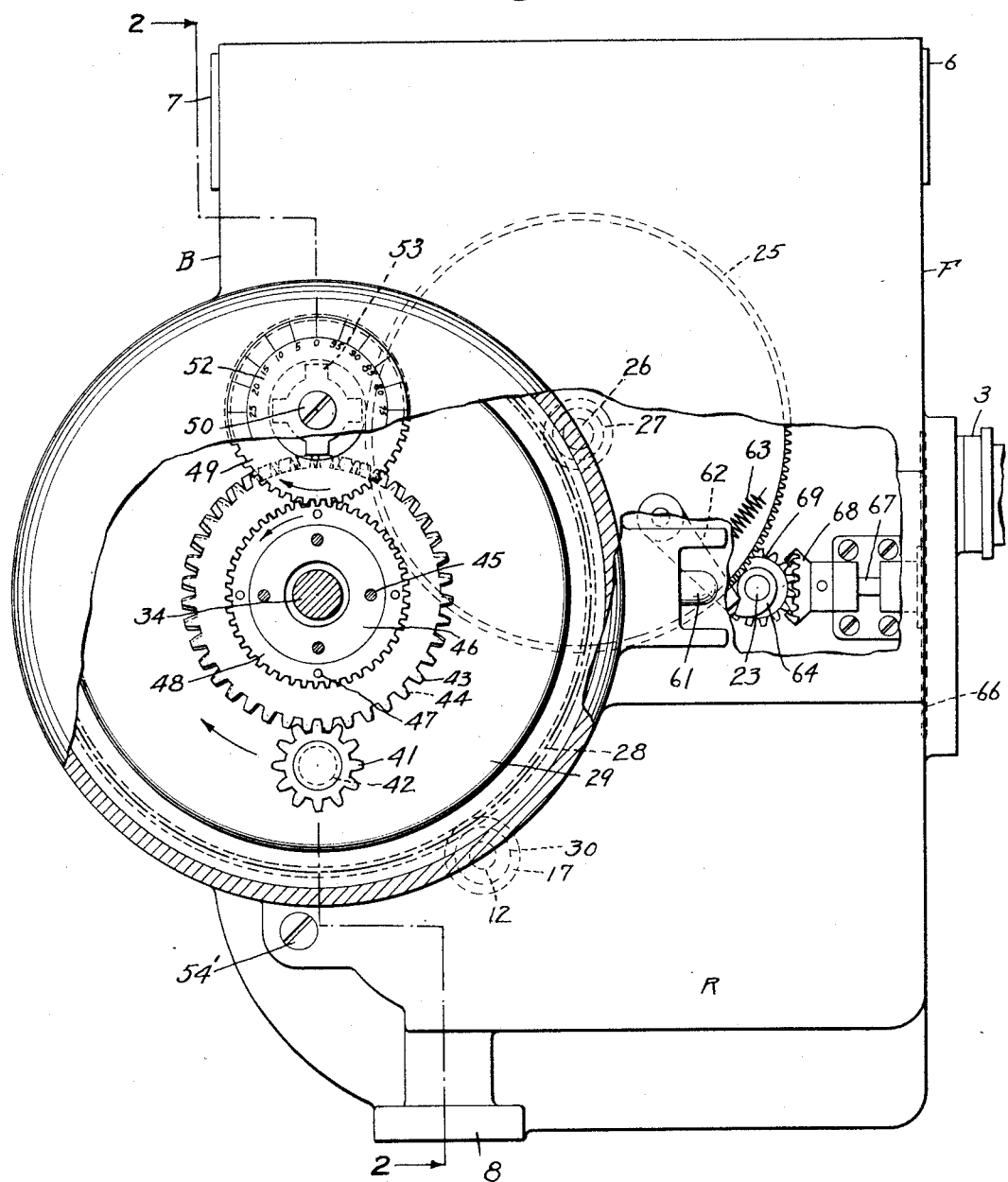
Figure 1 is a side elevational view of the apparatus, partly broken away.

In carrying out the present invention, I prefer to provide a central web W, upon which almost all of the operative parts of the apparatus are mounted, the removable cover L, which gives access to the gate, not shown, and the spindles of the apparatus, and a casing R, which encloses the spring and its housing, carrying the dial for the footage recording device. I prefer to make such three parts in the form of die castings although any preferred and suitable construction may be used. Preferably cast integrally with such central web W, is the front wall F upon which is suitably mounted the usual lens assembly indicated at 3. In the front wall F there may also be mounted the forward optical element 6 of a telescopic view finder, while in the back wall B, preferably likewise an extension from the web W, may be mounted the rear optical element 7 of such finder. A suitable boss 8, preferably cast as a portion of the web W, may be provided into which there may be introduced in any well known manner a screw or other connecting means whereby the camera may be effectively carried by a suitable support such as a tripod.

Supported in the central web W with one end journalled if desired in the bearing 17 in the side wall R is the take-up spindle 12 adapted to receive a suitable take-up reel.

For feeding the film from the delivery reel, not shown, to the take-up spindle 12, there may be provided teeth 21 intermittently operated by the cam 22 fixed to the shaft 23. Since the method of feeding the film through the apparatus forms no part of the present invention, it is not described in detail. Such shaft 23 may be operated by the pinion 24 fixed thereto which in turn is driven by the gear 25 mounted upon the shaft 26 and having affixed thereto the pinion 27 which is driven by the main driving gear 28 attached to the spring housing 29. For driving the spindle 12 there may be provided the pinion 30 attached to the shaft of such spindle and meshing with such driving gear 28. Power is transmitted from the pinion 30 to the spindle 12 through any desired type of yielding take-up clutch indicated by the reference character 31. One end of the spring 32 is attached to the housing 29 and the other end to the shaft 34. To prevent the unwinding of the spring when power is applied manually thereto by means of the handle 35 fixed to the shaft 34 a pawl and ratchet, not shown, or any other conventional type of detent may be employed. The shaft 34 may be journaled in the bearing 37 affixed to the outer protective casing R.

For operating the mechanism which records the number of revolutions of the spring housing 29 and hence of the feeding shaft 23 fingers 21 and the footage of film fed thereby, a pinion 41 may be attached to the right hand wall of the spring housing 29, as viewed in Figures 2 and 3, by means of a screw 42, such construction permitting the free revolution of the pinion. Engaging with such pinion there may be provided two gears 43 and 44 respectively, the gear 44 preferably having one tooth more than gear 43. Gear 43 is fixedly mounted to the wall of the casing R by means of the screws 45. The gear 44, however, is freely revoluble upon the hub 46 of the gear 43. By reason of such construction, it will be evident that when the pinion 41, owing to the rotation of the housing 29 during the unwinding of the spring, has made one complete revolution such gear 44 will have been rotated thereby a total distance equivalent to the movement of one tooth.

Fastened to the gear 44 by means of the screws 47 is the gear 48 which engages with the gear 49 mounted upon the screw 50. Such gear 49 is formed with a hub 51 which fits within a suitable aperture within the casing R. On the other side of such aperture is the dial 52 calibrated in any convenient way as is indicated in Figure 1. Between such dial and gear is the spring washer 53. Such construction obviously holds both the dial 52 and the gear 49 against movement lateral to the casing R and permits the resetting of the dial 52 by the conveniently provided pins 54 against the pressure of the spring washer 53.

It will be readily understood that the amount of power required to operate the dial from the pinion 41 is relatively so small as to be negligible. Moreover, even though the gears are rather loosely fitted in order to minimize the power requirement, the movement of the dial 52 is remarkably accurate. Moreover, such movement is continuous during the period during which the motor is in operation, thus avoiding the undesirable intermittent movement of the dial which is common to measuring devices which are operated by a pawl and ratchet.

The assembly of an apparatus such as has been described is obviously extremely simple. The film moving means, power train. spring, and shaft 34 are all assembled in the central web W. Into the casing R are inserted the bearings 17 and 37 and the sub-assembly consisting of gear 49, the dial 52, and the screw and washer. The sub-assembly of the gears 43 and 44 is made, and gear 43 is screwed to the casing R, the teeth of the gear 44 readily meshing with the gear 49. Thereupon the entire web W is slipped into position, the spindles 34 and 12 engaging with the journals 37 and 17 respectively, and the teeth of the pinion 41 engaging with those of the gears 43 and 44. The only manual adjustment which may be necessary is a slight movement of such gears by means of the pin 54 and the intervening train. Thereupon the handle 35 is pinned into position upon the shaft 34 by the pin 36 and the casing R attached to the web as by screws one of which is indicated at 54'. (Figure 1.) It will be readily understood that such assembly can be carried out in a very few minutes, and one of the important advantages of the present invention is the economy and efficiency which follow the above described arrangement.

For starting and stopping the mechanism, there may be provided a button 61 connected with the pawl 62 by an appropriate link not shown, held in position by the spring 63 and engaging with the stop formation 64 attached to the shaft 23. By the movement of the button 61 to the left, as viewed in Figure 1, the shaft 23 will be released and the spring motor permitted to drive the apparatus. The conventional shutter 66 mounted upon the shaft 67 may be driven by the right angled gears 68 and 69 the latter of which is pinned to the main operating shaft 23. It will thus be seen that the entire power train of the apparatus is simple and direct and the control directly applied to the operating shaft whereby requirement of power is minimized throughout the apparatus.

In the construction which is shown for purposes of illustration only, forty revolutions of the spring housing 29 are required to feed 100 feet of 16 millimeter film, such footage being that which is commercially supplied in the standard package and being represented by one complete revolution of the dial 52. It will be readily understood, however, that any other desired ratio may be employed, or that my invention may be applied to any apparatus in which film or any material is fed.

Certain of the advantages of my invention have been stated or made clear by the foregoing portion of this specification. Other advantages include the provision of an extremely simple efficient and practical material footage recording mechanism, and such mechanism in combination with a material handling apparatus, such mechanism and apparatus being so arranged as to operate with great efficiency and to be constructed or repaired with a minimum of expense and labor.

I claim:

1. In a film handling apparatus, means for feeding a film, a spring for driving said means, a gear bodily movable with said spring as said spring unwinds, for transmitting power to said feeding means, a device for registering the length of film fed by said feeding means, an actuating member for said registering device mounted for bodily movement with said gear, and means continuously connecting said actuating member and said registering device for continuously communicating the motion of said gear to said device as said spring unwinds.

2. In a film handling apparatus, means for feeding a film, a spring for driving said means, a casing for said spring bodily movable therewith as said spring unwinds, a device for registering the length of film fed by said feeding means, and actuating means for said registering device, said means including a member mounted upon said casing and bodily movable therewith rotationally movable in respect thereto while being bodily moved by said casing, and mechanism connecting said member and said device for transmitting the rotational movement of said member to said device whereby said device is operated as said spring unwinds.

3. In a film handling apparatus, means for feeding a film, a spring for driving said means, a casing for said spring movable therewith as said spring unwinds, a pinion mounted upon said casing for bodily movement therewith and rotational movement relatively thereto, a device for registering the length of film fed by said feeding means, and a gear train connecting said registering device and said pinion for continuously transmitting the rotational movement of said casing to said registering device as said pinion is bodily moved by said casing.

4. In a film handling apparatus, means for feeding a film, a spring for driving said means, a casing for said spring movable therewith, a pinion mounted upon said casing for movement therewith, a device for registering the length of film fed by said feeding means, and a gear train between said registering device and said pinion for transmitting the movement of said casing to said registering device, said gear train including two co-axial gears engaging said pinion, one of said gears being fixed and the other freely movable, the number of teeth of said gears differing.

5. In a film handling apparatus, means for feeding a film, a power shaft for said means, a member revoluble with said power shaft, a pinion mounted upon said member for bodily movement therewith, whereby the movement of said power shaft times the movement of said pinion, and for rotational movement upon an axis different from that of said revoluble member, a device for registering the length of film fed by said member, and a connection between said pinion and said device for transmitting the rotational movement of said pinion to said device for operating said device in accordance with such bodily movement of said pinion.

6. In a film handling apparatus, means for feeding a film, a power shaft for driving said means, a member revoluble with said power shaft, a pinion mounted upon said member for bodily movement therewith and for axial movement relative thereto, a device for registering the length of film fed by said member, and a motion transmitting connection between said pinion and said device, said motion transmitting connection including two coaxial gears in operative engagement with said pinion, one of said gears being fixed and the other of said gears being freely revoluble relatively thereto, one of said gears comprising at least one tooth more than the other of said gears.

7. In a film handling apparatus, means for feeding a film, a gear for driving said means, a spring for driving said gear, a device for registering the length of film fed by said means, and a motion transmitting connection between said registering device and said gear, said connection including an actuating member mounted for bodily movement with said gear and for revolution upon an axis different from that upon which said gear revolves, and devices interconnecting said member and said registering device for transmitting the rotative movement of said member to said registering device.

8. In a film handling apparatus, means for feeding a film, a shaft for driving said feeding means, a device for registering the length of film fed by said feeding means, and operating mechanism for transmitting the movement of said shaft to said device, said mechanism including an actuating member mounted for bodily movement with said shaft and for rotational movement upon an axis different from that of said shaft and a connection between said member and said device for transmitting the rotational movement of said member to said device in accordance with the bodily movement of said member with said shaft.

9. In a film handling apparatus, means for feeding a film, a shaft for operating said feeding means, a gear for driving said shaft, a device for registering the length of film fed by said means, and an operating connection between said gear and said device, said operating connection comprising a pinion mounted for bodily revolution with said gear, and means for transmitting motion between said pinion and said device, said means including two co-axial gears both engaging said pinion, one fixed and the other freely movable relatively thereto, the number of teeth upon said gears differing.

10. In a film handling apparatus having an outer protective casing, said casing being formed with an opening therein, a film feeding member, a spring for driving said feeding member, an element revoluble with said spring, and a winding shaft for said spring, said member, spring and element being enclosed within said casing and said shaft being largely enclosed therewithin, the combination of footage recording means, which can be assembled upon said casing independently of the other parts of the film handling apparatus and prior to the assembly of such other parts and an actuating pinion for said footage recording means, said pinion being mounted for revolution relative to said revoluble element and bodily movement therewith, said footage recording means including a dial, said dial being characterized by minimum dimensions greater than the maximum corresponding dimensions of such opening and being disposed exteriorly of said casing, an actuating element for said dial of minimum dimensions greater than the corresponding dimensions of such opening of said casing and disposed therewithin, a connection between said dial and said actuating element permitting free rotation of one relative to the other, means yieldingly moving said dial and said actuating element away from each other, a first gear fixed to said casing therewithin and with a central opening through which said spring shaft extends, said first gear and said spring shaft being coaxially mounted upon said casing, and said first gear being so positioned as to be continuously engaged by said actuating pinion as it is bodily moved by said element as said spring unwinds, a second gear, coaxial with said first gear and said spring shaft and with a central opening through which said spring shaft extends and disposed within said casing, mounted for revolution relatively to said first gear and to be engaged by said actuating pinion, said first and second gears having different numbers of teeth, and a motion transmitting member connecting said second gear and said actuating element for operating said actuating element and said dial upon the rotation of said second gear under the influence of said actuating pinion.

11. In a film handling apparatus, an outer protective casing including an opening therein, a footage recording dial of minimum dimensions greater than the maximum corresponding dimensions of such opening disposed exteriorly of said casing, an actuating member for said dial of minimum dimensions greater than the corresponding dimensions of such opening of said casing, said actuating member being disposed interiorly of said casing, a connection between said dial and said member permitting free rotation of one relative to the other, means yieldingly moving said dial and said member away from each other, a member for feeding a film, mechanism for driving said feeding member, and means interconnecting said mechanism and said actuating member whereby said mechanism drives said actuating member in accordance with the footage of film fed by said feeding member, said mechanism and said interconnecting means being positioned within said casing.

12. In a film handling apparatus, a member for feeding a film, mechanism for driving said feeding member, an outer protective casing for said driving mechanism, said casing including an opening therein, a footage recording dial of minimum dimensions greater than the maximum corresponding dimensions of such opening disposed exteriorly of said casing, an actuating member for said dial of minimum dimensions greater than the corresponding dimensions of such opening of said casing, said actuating member being positioned interiorly of said casing, a connection between said dial and said actuating member permitting free rotation of one relative to the other, means yieldingly moving said dial and said member away from each other, and means positioned within said casing for operatively connecting said driving mechanism and said actuating member whereby said mechanism drives said actuating member in accordance with the movement of said feeding member, said actuating member including a shoulder disposed within such opening and arranged to prevent extended longitudinal movement between said member and said opening.

13. In a film handling apparatus, an outer protective casing, a spring for driving said apparatus, a shaft upon which said spring revolves, a gear attached to said spring for revolution therewith, a dial for registering the movement of said gear, said dial being disposed exteriorly of said casing, a motion transmitting connection between said gear and said dial, said connection including motion transmitting means supported by said shaft and freely movable relatively thereto, an actuating member for said means bodily movable with said gear and rotatable upon an axis differing from that of said gear whereby movement is communicated to said means in accordance with the movement of said gear and shaft and a member disposed between said means and said dial and effective to transmit the power of said means to said dial.

14. In a film handling apparatus, film feeding means, a member for driving said feeding means, a shaft upon which said driving member is revoluble, a dial and motion transmitting means between said dial and said driving member, said motion transmitting means including a gear loosely mounted about said shaft, a pinion for driving said gear mounted for bodily movement with said member and disposed in driving engagement with said gear, and a motion transmitting element between said gear and said dial.

15. In a film handling apparatus, a protective casing including an opening, a closure for said opening, film feeding means, a spring for driving said feeding means, a shaft upon which said spring is revoluble, a dial for recording the movement of said spring, and mechanism for operating said dial, said dial being supported by said closure upon an exterior face thereof, and said spring shaft and mechanism being disposed within said casing and said mechanism including motion transmitting means mounted upon said shaft for free revolution relative thereto, an actuating member for said means mounted for bodily revolution circumferentially of said shaft, a connection between said actuating member and said spring for moving said actuating member in acance with the unwinding of said spring, and an operating connection between said means and said dial for transmitting such bodily revolution to said dial for operating said dial in accordance with the movement of said spring.

16. In a film handling apparatus, film feeding means, an outer protective casing, a dial disposed exteriorly of said casing for recording the operation of said feeding means, and an operating connection between said dial and said feeding means, said operating connection being disposed within said casing and including a plurality of timing gears one of which is mounted in fixed relation to said casing and another of which is mounted in co-axial relation to said first mentioned gear and for free revolution with respect thereto, said above mentioned timing gears having differing numbers of teeth, means for transmitting the motion of said timing gears to said dial, an actuating pinion disposed in operative relation to said last previously mentioned timing gear and bodily movable circumferentially of said timing gears and in contact therewith, and means for moving said actuating pinion in accordance with the movement of said feeding means.

17. In a film handling apparatus, film feeding means, a gear for driving said means, an outer protective casing, a dial disposed exteriorly of said casing for recording the number of operations of said feeding means, and an operating connection between said dial and said driving gear, said operating connection being disposed within said casing and including a plurality of timing gears and an actuating gear therefor, and means for transmitting the motion of said timing gears to said dial, one of said timing gears being mounted in fixed relation to said casing and in co-axial relation to said driving gear and the other of said timing gears being mounted in co-axial relation to said first mentioned timing gear for free revolution with respect thereto, said timing gears having different numbers of teeth, and said actuating gear being mounted for bodily movement with said driving gear and free revolution with respect thereto and being disposed in engagement with both of said timing gears.

18. In a film handling apparatus, film feeding means, an outer protective casing, a dial disposed exteriorly of said casing for recording the operation of said feeding means, and an operating connection between said dial and said feeding means, said operating connection being disposed within said casing and including a plurality of timing gears for driving said dial, means for transmitting the motion of said timing gears to said dial one of said gears being mounted in fixed relation to said casing and the other of said gears being mounted in co-axial relation to said first mentioned gear and for free revolution relatively thereto, said gears being of approximately the same diameter but differing in the number of teeth, an actuating pinion in engagement with both of said above mentioned timing gears and bodily circumferentially movable about said timing gears, and means connecting said actuating pinion and said film feeding means for moving said pinion circumferentially of said timing gears and in contact therewith in accordance with the movement of said feeding means.

19. In a film handling apparatus, means for feeding a film, a spring for driving said means, an element movable with said spring as it unwinds, a pinion mounted upon said element for movement therewith, a shaft upon which said spring is wound, a device for registering the length of film fed by said feeding means, and a gear train between said registering device and said pinion for transmitting the movement of said element to said registering device, said gear train including two gears co-axial with each other and with said shaft and disposed in engagement with said pinion, one of said gears being fixed and the other mounted for free revolution relatively to said shaft and to said co-axial fixed gear, the number of teeth of said gears differing, and connections between said freely mounted gear and said recording device for operating said recording device by the movement of said freely mounted gear.

FREDERICK DAVENPORT SWEET.